United States Patent
Kobayashi et al.

(10) Patent No.: US 8,977,892 B2
(45) Date of Patent: Mar. 10, 2015

(54) DISK CONTROL APPARATUS, METHOD OF DETECTING FAILURE OF DISK APPARATUS, AND RECORDING MEDIUM FOR DISK DIAGNOSIS PROGRAM

(75) Inventors: Kenji Kobayashi, Kawasaki (JP); Norihide Kubota, Kawasaki (JP); Atsushi Igashira, Yokohama (JP); Ryota Tsukahara, Kawasaki (JP); Hidejirou Daikokuya, Kawasaki (JP); Kazuhiko Ikeuchi, Kawasaki (JP); Chikashi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 13/541,822

(22) Filed: Jul. 5, 2012

(65) Prior Publication Data
US 2013/0024730 A1 Jan. 24, 2013

(30) Foreign Application Priority Data

Jul. 22, 2011 (JP) ................................. 2011-161051

(51) Int. Cl.
| | |
|---|---|
| G06F 11/00 | (2006.01) |
| G11B 5/09 | (2006.01) |
| G11B 5/012 | (2006.01) |
| G06F 11/07 | (2006.01) |

(Continued)

(52) U.S. Cl.
CPC *G11B 5/09* (2013.01); *G11B 5/012* (2013.01); *G06F 11/0727* (2013.01); *G06F 11/079* (2013.01); *G06F 11/1076* (2013.01); *G11B 20/18* (2013.01); *G11B 2220/415* (2013.01)
USPC ............... 714/6.22; 714/6.1; 714/6.2; 714/42

(58) Field of Classification Search
CPC . G06F 11/07; G06F 11/0727; G06F 11/1076; G06F 11/1084; G06F 11/2069; G06F 11/2089; G06F 11/3034
USPC ................ 714/6.1, 6.2, 6.22, 25, 37, 42, 47.1
See application file for complete search history.

(56) References Cited

U.S. PATENT DOCUMENTS

| | | | |
|---|---|---|---|
| 6,081,771 A | 6/2000 | Urabe | |
| 7,558,988 B2 | 7/2009 | Ishii et al. | |
| 7,779,306 B1 * | 8/2010 | Philbin et al. ................... | 714/43 |

(Continued)

FOREIGN PATENT DOCUMENTS

| | | |
|---|---|---|
| JP | 11-85557 | 3/1999 |
| JP | 2006-4078 | 1/2006 |

(Continued)

OTHER PUBLICATIONS

Japanese Notification of Reasons for Refusal in Japanese Application No. 2011-161051.

*Primary Examiner* — Joseph D Manoskey
(74) *Attorney, Agent, or Firm* — Staas & Halsey LLP

(57) ABSTRACT

A disk control apparatus includes a processor, and a memory coupled to the processor in which executes a process as follows. The process includes diagnosing whether or not a failure has occurred on each of a plurality of disk apparatuses, determining, when the failure has occurred, whether or not the failure is a pre-defined failure, and excluding from diagnosis targets, when the failure is the pre-defined failure, a disk apparatus group included in a RAID together with a failed disk apparatus that is determined to have the pre-defined failure in the plurality of disk apparatuses.

13 Claims, 10 Drawing Sheets

(51) Int. Cl.
*G06F 11/10* (2006.01)
*G11B 20/18* (2006.01)

(56) References Cited

U.S. PATENT DOCUMENTS

| | | |
|---|---|---|
| 2005/0283651 A1 | 12/2005 | Kikuchi |
| 2006/0069947 A1* | 3/2006 | Takahashi et al. ................ 714/6 |
| 2007/0174719 A1* | 7/2007 | Inoue et al. ..................... 714/42 |
| 2007/0226537 A1* | 9/2007 | Elliott et al. ................... 714/13 |
| 2009/0089503 A1 | 4/2009 | Yoshida et al. |
| 2009/0249117 A1* | 10/2009 | Horikoshi ........................ 714/6 |
| 2009/0307524 A1 | 12/2009 | Kumano et al. |

FOREIGN PATENT DOCUMENTS

| | | |
|---|---|---|
| JP | 2007-141185 | 6/2007 |
| JP | 2007-213721 | 8/2007 |
| JP | 2007/233915 | 9/2007 |
| JP | 2009/086971 | 4/2009 |
| WO | WO 2008/136074 | 12/2009 |

* cited by examiner

DISK CONTROL APPARATUS, METHOD OF DETECTING FAILURE OF DISK APPARATUS, AND RECORDING MEDIUM FOR DISK DIAGNOSIS PROGRAM

CROSS-REFERENCE TO RELATED APPLICATION

This application is based upon and claims the benefit of priority of the prior Japanese Patent Application No. 2011-161051, filed on Jul. 22, 2011, the entire contents of which are incorporated herein by reference.

FIELD

The embodiments discussed herein are related to a disk control apparatus, a method of detecting failure of a disk apparatus, and a recording medium for a disk diagnosis program.

BACKGROUND

For disk array apparatuses provided with multiple disk apparatuses, RAID (redundant arrays of inexpensive disks) has been proposed as a technology for combining the multiple disk apparatuses so that the multiple disk apparatuses may be utilized as a single virtual data storage. Several types of RAID have been developed in accordance with differences in the setup of combinations of the disk apparatuses. In RAID, the disk apparatuses are set to have a redundancy structure, and even when a failure occurs in one disk apparatus, storage data in that one disk apparatus may be reconstructed by utilizing storage data of another disk apparatus. In addition, a system that is not provided with such a redundancy structure may also be included in RAID in some cases.

A technology has been proposed for cyclically patrolling and accessing each of the multiple disk apparatuses constituting a disk array apparatus at a certain frequency irrespective of accesses from a host and diagnosing the disk apparatus to detect a failure. This technology is also referred to as disk patrol. When a read error occurs during this disk patrol, a certain amount of data is read out from the disk apparatus where the error has occurred and an inspection of the relevant data is carried out with priority.

Further, a technology has been proposed for turning on a power supply of a disk drive, which has been turned off to reduce power consumption because an access has not been carried out for a long period of time, after an elapse of a certain period of time since the turning-off of the power supply. The power supply is turned on so as to conduct the failure inspection irrespective of an access situation.

Furthermore, a technology has been proposed for efficiently conducting failure detection. According to this technology, first, plural checking programs are sorted into groups while a length of time between failures of an apparatus is used as a reference, and execution intervals of the respective checking programs in the respective groups are decided in accordance with the length of the time between failures. According to this technology, when even a checking result of a single checking program in the executions of the plural checking programs in the same group indicates a fault, the checking operations of the group are set to terminate.

In the detection of a failure in the disk apparatuses by using the above-described disk patrol, a frequency of accesses for the diagnosis carried out on the respective disk apparatuses may be increased to more promptly carry out failure detection. However, if the frequency of accesses for the diagnosis is simply increased, a probability of a congestion of the accesses from the host is accordingly increased, and the original access performance is decreased.

Examples of related art are discussed in Japanese Laid-open Patent Publications Nos. 2006-4078, 2007-213721, and 11-85557.

SUMMARY

According to an aspect of the embodiments, a disk control apparatus includes a processor, and a memory coupled to the processor, wherein the processor executes a process. The process includes diagnosing whether or not a failure has occurred on each of a plurality of disk apparatuses, determining, when the failure has occurred, whether or not the failure is a pre-defined failure, and excluding from diagnosis targets, when the failure is the pre-defined failure, a disk apparatus group included in a RAID together with a failed disk apparatus that is determined to have the pre-defined failure in the plurality of disk apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
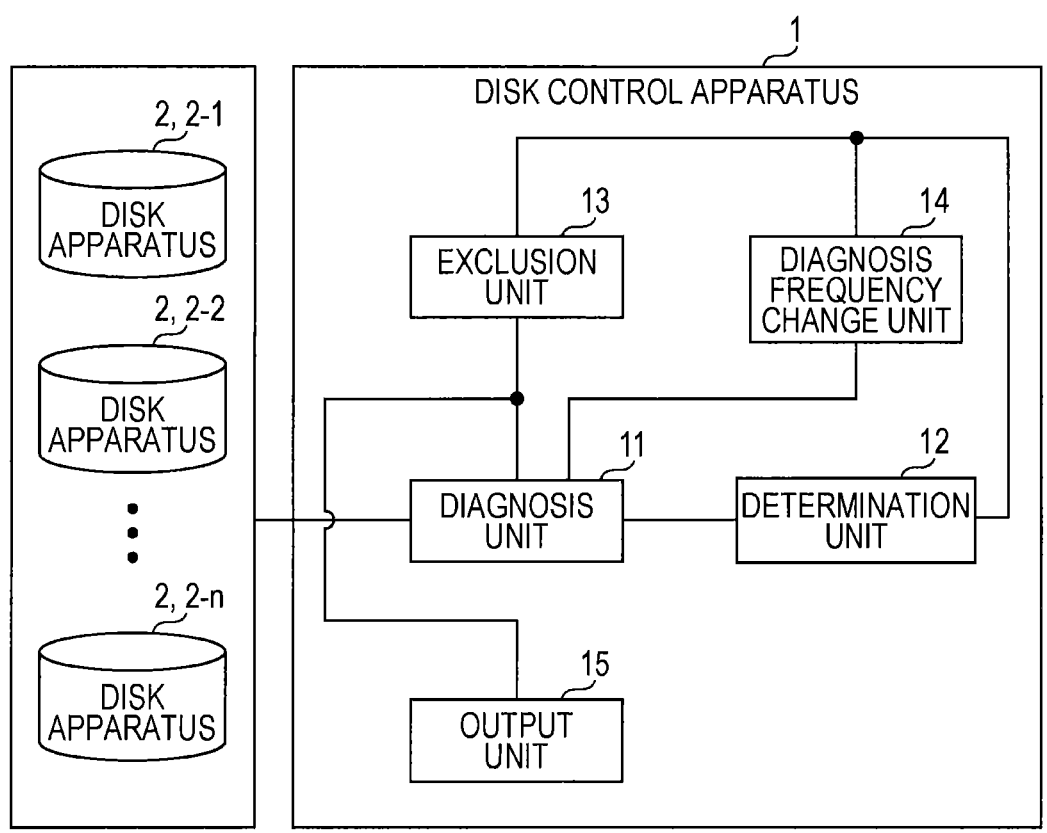
FIG. 1 is a functional block diagram of a disk control apparatus according to an embodiment.

FIG. 1 is a functional block diagram of a disk control apparatus according to an embodiment.

The disk control apparatus 1 is configured to control multiple disk apparatuses 2-1, 2-2, . . . , 2-$n$. The disk apparatuses 2-1, 2-2, . . . , 2-$n$ are storage apparatuses that store data.

It is noted that in the following description, each of the disk apparatuses 2-1, 2-2, . . . , 2-$n$ is referred to as a "disk apparatus 2", or the disk apparatuses 2-1, 2-2, . . . , 2-$n$ are collectively referred to as "disk apparatuses 2".

The disk control apparatus 1 includes a diagnosis unit 11, a determination unit 12, and an exclusion unit 13.

The diagnosis unit 11 is configured to perform diagnosis on each of the multiple disk apparatuses 2 to check whether or not the disk apparatus has a failure.

The determination unit 12 is configured to determine, when a failure is diagnosed by the diagnosis unit 11, whether or not the failure is a predetermined failure. The predetermined failure is, for example, a severe failure in which the redundancy of storage data obtained by the above-described redundancy structure is lost, in a case where the redundancy structure is realized by some of the multiple disk apparatuses 2.

When the determination unit 12 determines that the failure diagnosed by the diagnosis unit 11 is the predetermined failure, the exclusion unit 13 excludes a disk apparatus 2 included in the RAID together with the failed disk apparatus among the multiple disk apparatuses 2 from diagnosis targets of the diagnosis unit 11. It is noted that the failed disk apparatus is the disk apparatus 2 determined to have the predetermined failure by the determination unit 12.

In a case where a disk apparatus 2 diagnosed to have the failure is a failed disk apparatus, a situation occurs in the RAID including the failed disk apparatus, in which an operation for avoiding loss of the storage data is promptly carried out. In other words, after a failed disk apparatus is found, this is not a situation in which a diagnosis as to whether the disk apparatus has a failure is repeatedly carried out on the disk apparatus 2 included in the RAID together with the failed disk apparatus. In view of the above, in this case, the exclusion unit 13 excludes the disk apparatus 2 included in the RAID together with the failed disk apparatus among the multiple disk apparatuses 2 from the diagnosis targets of the diagnosis unit 11. With this configuration, since a frequency at which the diagnosis process is performed on the remaining disk apparatuses 2 that have not been excluded by the exclusion unit 13 can be increased, it is possible to promptly detect a failure in the remaining disk apparatuses 2.

The disk control apparatus 1 may further include a diagnosis frequency change unit 14.

The diagnosis frequency change unit 14 is configured to change a frequency at which diagnosis is performed by the diagnosis unit 11 to be higher with respect to some of the disk apparatuses 2 that have not been excluded from the multiple disk apparatuses 2 by the exclusion unit 13. The diagnosis frequency change unit 14 performs the frequency change when the determination unit 12 determines that a failure diagnosed by the diagnosis unit 11 is the above-described predetermined failure. In addition, the diagnosis frequency change unit 14 performs the frequency change on a disk apparatus 2 in which assigned attribute information has a certain similarity relationship with the failed disk apparatus among the disk apparatuses 2 that have not been excluded from the multiple disk apparatuses 2 by the exclusion unit 13.

It is possible to predict that the disk apparatus 2 in which the assigned attribute information has a certain similarity relationship with the failed disk apparatus is similar to the failed disk apparatus also with regard to an occurrence timing of a failure. Therefore, it is predicted that a failure is likely to occur in this disk apparatus 2. This attribute information is, for example, a production number assigned to the disk apparatus 2. It is possible to predict that the mutual disk apparatuses 2 having production numbers within a certain range are similar to each other with regard to the occurrence timing of a failure. In view of the above, the diagnosis frequency change unit 14 changes the frequency at which diagnosis is performed by the diagnosis unit 11 to be higher with respect to a disk apparatus 2 having attribute information that has the similarity relationship with the failed disk apparatus among the disk apparatuses 2 that have not been excluded from the multiple disk apparatuses 2 by the exclusion unit 13. With this configuration, it is possible to promptly detect a failure in a disk apparatus 2 for which it has been predicted that a failure is likely to occur.

The diagnosis frequency change unit 14 may avoid changing the frequency at which diagnosis is performed with respect to some of the disk apparatuses 2 having attribute information that has the above-described similarity relationship with the failed disk apparatus. To be more specific, the diagnosis frequency change unit 14 may avoid changing the frequency at which diagnosis is performed with respect to a disk apparatus 2 securing redundancy with a disk apparatus 2 having attribute information that does not have the similarity relationship with the failed disk apparatus.

In the disk apparatus 2 securing redundancy with the disk apparatus 2 having attribute information that does not have the similarity relationship with the failed disk apparatus, even when a failure actually occurs and the storage data is lost, the relevant storage data can be reconstructed. In view of the above, the frequency at which diagnosis is performed is not changed by the diagnosis frequency change unit 14 with respect to the above-described disk apparatus 2 even when it is predicted that a failure is likely to occur in the disk apparatus 2 as described above. With this configuration, it is possible to promptly detect a failure in the disk apparatus 2 for which it has been predicted that a failure is likely to occur and that the reconstruction of the storage data may be interfered with if a failure occurs.

When the determination unit 12 determines that the failure diagnosed by the diagnosis unit 11 is not the above-described predetermined failure, the diagnosis frequency change unit 14 may increase the frequency at which diagnosis is performed by the diagnosis unit 11 with respect to some of the multiple disk apparatuses 2. Herein, the diagnosis frequency change unit 14 increases the frequency at which diagnosis is performed with respect to a disk apparatus 2 having attribute information that has the above-described similarity relationship with a disk apparatus that has a minor failure among the multiple disk apparatuses 2. It is noted that a disk apparatus that has had a minor failure is a disk apparatus 2 for which the diagnosis unit 11 has diagnosed that the disk apparatus has had a failure but for which the determination unit 12 has determined that this failure is not the predetermined failure among the multiple disk apparatuses 2.

It is possible to predict that the disk apparatus 2 securing redundancy with the disk apparatus 2 having attribute information that has the similarity relationship with the disk apparatus will also be similar to the disk apparatus with regard to the occurrence timing of the failure. Therefore, in the above-described disk apparatus 2, it is predicted that a failure is likely to occur. In view of the above, the diagnosis frequency change unit 14 changes the frequency at which diagnosis is performed by the diagnosis unit 11 to be higher with respect to the disk apparatus 2 having attribute information that has the similarity relationship with the disk apparatus that has had a minor failure among the multiple disk apparatuses 2. With this configuration, it is possible to promptly detect a failure in the disk apparatus 2 where it is predicted that the failure is likely to occur.

The diagnosis frequency change unit 14 may avoid changing the frequency at which diagnosis is performed with respect to some of the disk apparatuses 2 having attribute information that has the above-described similarity relationship with the disk apparatus that has had a minor failure. The some of the disk apparatuses 2 are, to be more specific, the disk apparatuses 2 securing redundancy with the disk apparatuses 2 having attribute information that does not have the similarity relationship with the disk apparatus that has a minor failure.

In a disk apparatus 2 securing redundancy with a disk apparatus 2 having attribute information that does not have the similarity relationship with the disk apparatus that has had a minor failure, even when a failure actually occurs and the storage data is lost, the storage data can be reconstructed. In view of the above, the frequency at which diagnosis is performed is not changed by the diagnosis frequency change unit 14 with respect to the above-described disk apparatus 2 even when it is predicted that a failure is likely to occur in the disk apparatus 2 as described above. With this configuration, it is possible to promptly detect a failure in the disk apparatus 2 for which it has been predicted that a failure is likely to occur and that the reconstruction of the storage data may be interfered with if a failure occurs.

In addition, the disk control apparatus 1 may further include an output unit 15.

The output unit 15 is configured to output, when the determination unit 12 determines that a failure diagnosed by the diagnosis unit 11 is the above-described predetermined failure, a warning representing the result of the determination.

As described above, in a case where the disk apparatus 2 for which a failure has been detected is a failed disk apparatus, in the RAID including the failed disk apparatus, a situation occurs in which an operation for avoiding the loss of the storage data is promptly carried out. The output unit 15 outputs a certain warning representing the occurrence of this situation. With the output of the warning, the occurrence of the above-described situation is immediately reported, and the appropriate operation can be promptly started.

Figure 2:
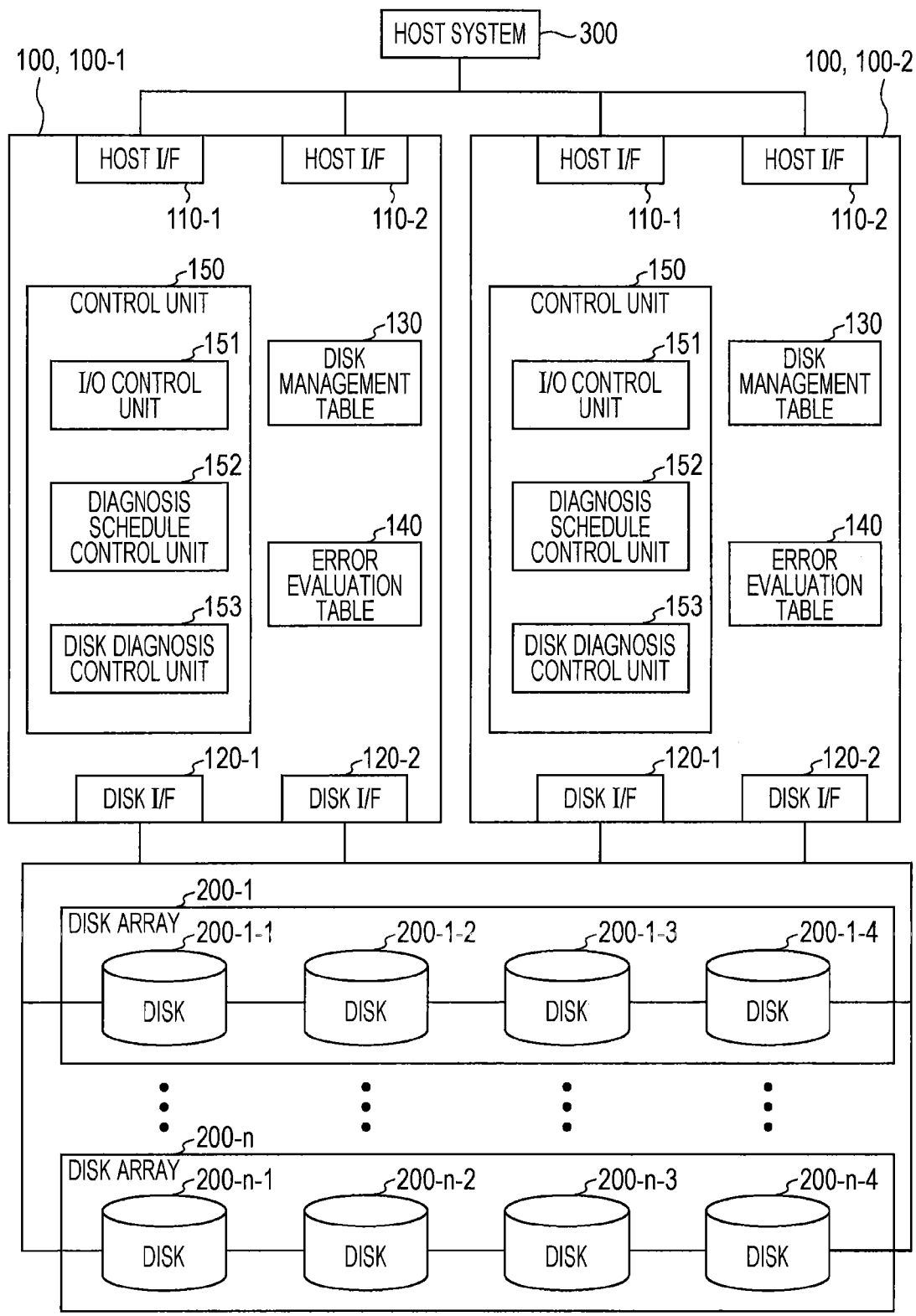
FIG. 2 is a functional block diagram of a disk control apparatus according to another embodiment.

Next, a description will be given of FIG. 2. FIG. 2 is a functional block diagram of a disk control apparatus according to another embodiment.

Disk control apparatuses 100-1 and 100-2 are configured to control disk arrays 200-1, ..., 200-n. A host system 300 is a system that uses a storage system including the disk control apparatuses 100-1 and 100-2 and the disk arrays 200-1, ..., 200-n.

The disk control apparatuses 100-1 and 100-2 have identical configurations and redundancy through a duplex structure. According to the present embodiment, one of the disk control apparatuses 100-1 and 100-2 is regularly used as an operation system and the other thereof is caused to stand by as a reserve system. It is noted that in the following description, each of the disk control apparatuses 100-1 and 100-2 is referred to as a "disk control apparatus 100", or the disk control apparatuses 100-1 and 100-2 are collectively referred to as "disk control apparatuses 100", and a disk control apparatus 100 will be described.

The disk control apparatus 100 is provided with host I/Fs 110-1 and 110-2, disk I/Fs 120-1 and 120-2, a disk management table 130, an error evaluation table 140, and a control unit 150.

The host I/Fs 110-1 and 110-2 are interface apparatuses that transmit and receive various types of data to and from the host system 300.

The disk I/Fs 120-1 and 120-2 are interface apparatuses that transmit and receive various types of data to and from the disk arrays 200-1, ..., 200-n.

The host I/Fs 110-1 and 110-2 have identical configurations and the disk I/Fs 120-1 and 120-2 have identical configurations, and redundancy is secured through a duplex structure. According to the present embodiment, one of the host I/Fs 110-1 and 110-2 and one of the disk I/Fs 120-1 and 120-2 are regularly used as an operation system, and those other I/Fs are caused to stand by as a reserve system.

The disk management table 130 is a table for managing attribute information on each of the disks 200-1-1, ..., 200-1-4, ..., 200-n-1, ..., 200-n-4 respectively provided to the disk arrays 200-1, ..., 200-n.

Figure 3:
FIG. 3 illustrates an example of an error evaluation table.

The error evaluation table 140 is a table in which evaluation points representing degrees of severity of errors detected in the disks 200-1-1, ..., 200-1-4, ..., 200-n-1, ..., 200-n-4 are associated with respective types of errors. FIG. 3 illustrates an example of the error evaluation table 140.

The control unit 150 is configured to perform control on operations performed by respective units included in the disk control apparatus 100 and perform, in particular, control for executing the above-described disk patrol for each of the disks 200-1-1, ..., 200-1-4, ..., 200-n-1, ..., 200-n-4. The control unit 150 includes an I/O control unit 151, a diagnosis schedule control unit 152, and a disk diagnosis control unit 153.

The I/O control unit 151 is configured to perform operation control on the host I/Fs 110-1 and 110-2 and the disk I/Fs 120-1 and 120-2.

The diagnosis schedule control unit 152 is configured to perform control for creating an execution schedule of diagnosis on each of the disks 200-1-1, ..., 200-1-4, ..., 200-n-1, ..., 200-n-4 (detection of a failure and determination of the degree of severity of a detected failure).

The disk diagnosis control unit 153 is configured to perform control for executing diagnosis on each of the disks 200-1-1, ..., 200-1-4, ..., 200-n-1, ..., 200-n-4 while following the schedule created by the diagnosis schedule control unit 152.

The disk diagnosis control unit 153 accesses each of the disks 200-1-1, ..., 200-1-4, ..., 200-n-1, ..., 200-n-4 and detects a disk error by receiving an error message as a reply. This error message includes information indicating an error type. The disk diagnosis control unit 153 determines the degree of severity of the disk error on the basis of the evaluation point associated with this error type in the error evaluation table 140.

It is noted that in the disk control apparatus 100, the disk diagnosis control unit 153 provides functions equivalent to the diagnosis unit 11 and the determination unit 12 in FIG. 1, and the diagnosis schedule control unit 152 provides functions equivalent to the exclusion unit 13 and the diagnosis frequency change unit 14 in FIG. 1. The host I/Fs 110-1 and 110-2 provide functions equivalent to the output unit 15 in FIG. 1.

Each of the disks 200-1-1, ..., 200-1-4, ..., and 200-n-1, ..., 200-n-4 is a hard disk storage apparatus. In the present embodiment, four disks are provided to each of the disk arrays 200-1, ..., 200-n, and these disks 200-1-1, ..., 200-1-4, ..., and 200-n-1, ..., 200-n-4 constitute RAID 5. In the following description, RAID groups formed by each of the disk arrays 200-1, ..., 200-n are respectively referred to as group 1, ..., n.

In the disk management table 130, information on the RAID group to which each of the disks 200-1-1, ..., 200-1-4, ..., and 200-n-1, ..., 200-n-4 belongs is also managed.

Figure 4:
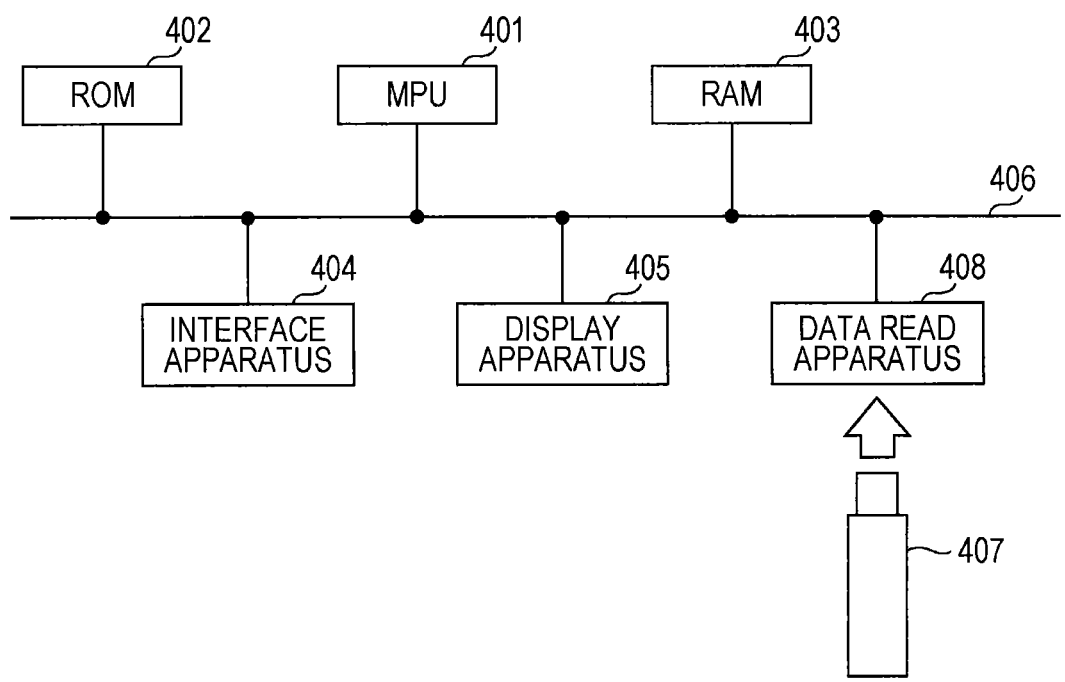
FIG. 4 is a diagram illustrating a hardware configuration of the disk control apparatus.

Next, FIG. 4 will be described. FIG. 4 illustrates a hardware configuration of the disk control apparatus 100.

The disk control apparatus 100 is configured to include a micro processing unit (MPU) 401, a read only memory (ROM) 402, a random access memory (RAM) 403, an interface apparatus 404, and a display apparatus 405. These components are all connected to a bus line 406 and are configured so as to transmit and receive various types of data to and from each other under the management of the MPU 401.

The MPU 401 is an arithmetic processing unit that controls operations of the entire disk control apparatus 100 and functions as the I/O control unit 151, the diagnosis schedule control unit 152, and the disk diagnosis control unit 153 in FIG. 2.

The ROM 402 is a non-volatile semiconductor memory in which control programs including a program for causing the MPU 401 to execute a disk patrol process which will be described below are recorded in advance. The ROM 402 is, for example, a flash memory. The MPU 401 executes a control program at the time of the activation of the disk control apparatus 100 to enable the operation control to be performed on the respective components of the disk control apparatus 100. Thus, the above-described functions of the respective units of FIG. 2 can be provided.

The RAM 403 is a semiconductor memory used as a working storage area in which writing and reading can be randomly carried out when the MPU 401 executes various control programs.

The interface apparatus 404 is configured to manage the transmission and reception of various types of data with various devices that are connected to the disk control apparatus 100. The interface apparatus 404 functions as the host I/Fs 110-1 and 110-2 and the disk I/Fs 120-1 and 120-2 in FIG. 2.

The display apparatus 405 is, for example, a liquid crystal display or a light emitting diode (LED) device that is configured to perform various display operations while following instructions from the MPU 401. The display apparatus 405 may provide functions equivalent to the output unit 15 in FIG. 1.

As described above, the disk control apparatus 100 has a configuration similar to that of a computer having a standard configuration.

The above-described control programs for causing the MPU 401 to execute the operation control on the respective components of the disk control apparatus 100 may be stored on a portable recording medium 407. The portable recording medium 407 is, for example, a flash memory provided with a Universal Serial Bus (USB) specification connector, a CD-ROM (Compact Disc Read Only Memory), a DVD-ROM (Digital Versatile Disc Read Only Memory) can be used. In a case where the above-described configuration is used, a data read apparatus 408 configured to read the data on the portable recording medium 407 is provided to the disk control apparatus 100 and connected to the bus line 406. When a state is established in which the control program recorded on the portable recording medium 407 can be read out by the data read apparatus 408, the MPU 401 performs a process of causing the data read apparatus 408 to read out the control program to be stored on the ROM 402. With this configuration, the control program recorded on the portable recording medium 407 can be executed by the MPU 401, and it becomes possible to carry out the operation control on the respective components of the disk control apparatus 100.

Figure 5:
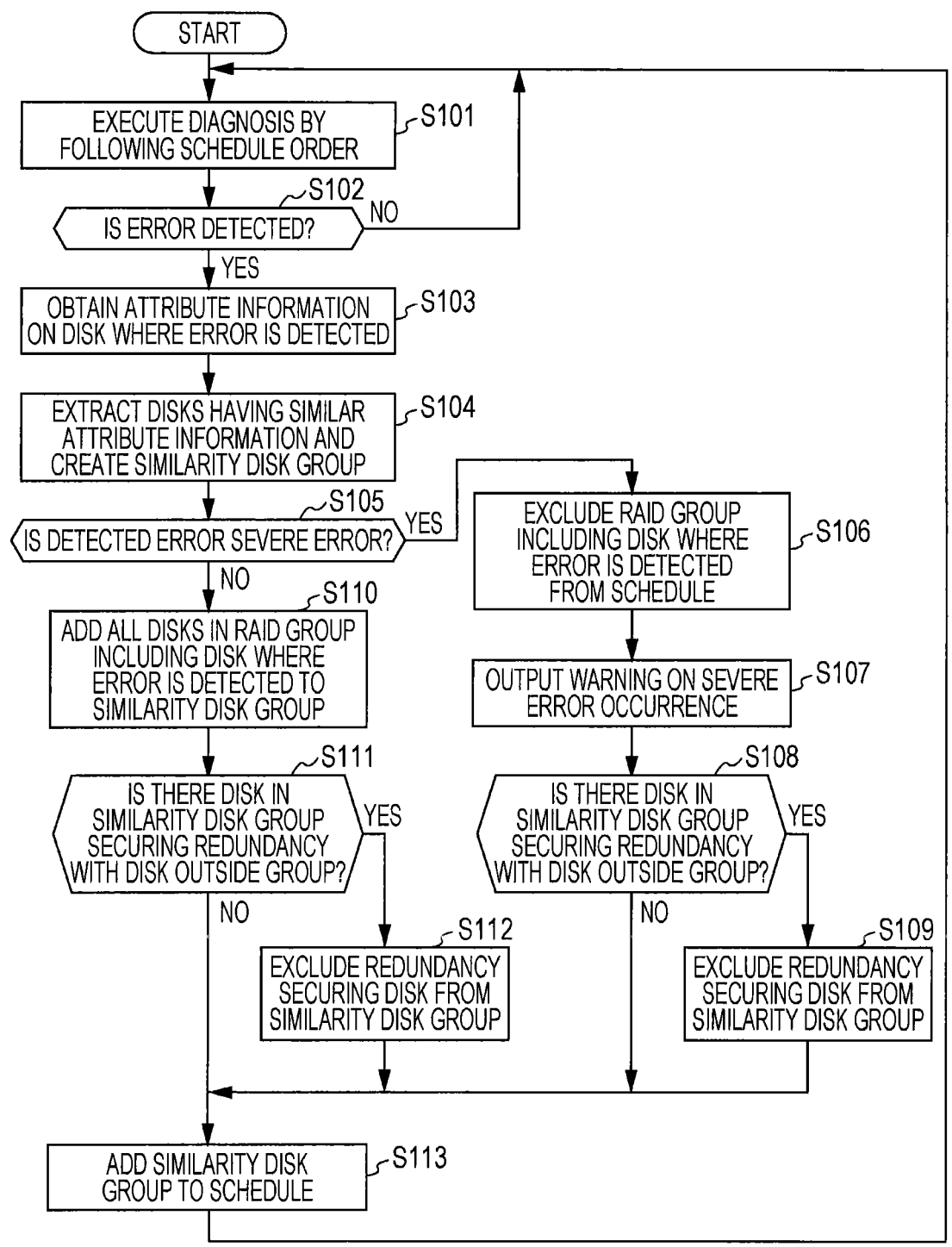
FIG. 5 is a method illustrating details of a disk patrol control process.

Next, FIG. 5 will be described. FIG. 5 is a method illustrating details of the disk patrol control process. This process is carried out by the MPU 401 of FIG. 4, and the various types of functions of the control unit 150 in FIG. 2 are provided.

It is noted that before the start of this process of FIG. 5, the group 1, . . . , the group n of the above-described RAID are initially set in this order as the execution schedule of the disk diagnosis. Also, in the respective groups, the disk diagnosis is conducted in the order of the assigned symbols in FIG. 2. That is, for example, in the group 1, the disk diagnosis is carried out in the order of the disk 200-1-1, the disk 200-1-4.

The process of FIG. 5 is started when the MPU 401 receives an instruction indicating the start of the disk patrol.

In FIG. 5, first, in S101, the disk diagnosis control unit 153 performs a process of detecting a disk error by repeatedly carrying out the execution of the disk diagnosis following the currently set order of the execution schedule. A disk error is detected by, for example, receiving an error message as a reply to a disk access. The disk diagnosis control unit 153 that executes this process provides a function equivalent to the diagnosis unit 11 in FIG. 1.

Next, in S102, the disk diagnosis control unit 153 performs a process of determining whether or not a disk error is detected in the disk diagnosis executed through the process in S101. At this time, when it is determined that the disk error is detected (when the determination result is Yes), the disk diagnosis control unit 153 advances the process to S103. On the other hand, at this time, when it is determined that the disk error is not detected (when the determination result is No), the disk diagnosis control unit 153 returns the process to S101 and continues the process of detecting a disk error.

In the subsequent description, the disk in which a disk error is detected by the disk diagnosis control unit 153 in the above-described manner is referred to as an "error detection disk".

First, in S103, the diagnosis schedule control unit 152 performs a process of referring to the disk management table 130 and obtaining attribute information on the error detection disk.

Next, in S104, the diagnosis schedule control unit 152 performs a process of further referring to the disk management table 130, extracting disks having attribute information that is similar to that of the error detection disk and creating a group composed of the extracted disks. The group created through this process is referred to as a "similarity disk group".

Next, in S105, the disk diagnosis control unit 153 performs a process of determining whether or not the error detected in the error detection disk is a predetermined severe error. The disk diagnosis control unit 153 that executes this process provides a function equivalent to the determination unit 12 in FIG. 1.

According to the present embodiment, in this process in S105, first, the error evaluation table 140 (FIG. 3) is referred to and an evaluation point with regard to the error detected in the error detection disk is obtained to perform a magnitude comparison between this evaluation point and a threshold point. When the evaluation point is higher than or equal to the threshold point, it is determined that the relevant error is severe. When the evaluation point is lower than the threshold point, it is determined that the relevant error is minor. In a case where plural errors are detected in the error detection disk, a magnitude comparison between a total of the evaluation points of the respective errors and a threshold point is performed. Therefore, according to this determination process, even when each of the plural errors detected from the error detection disk is minor, it may be determined that the error detection disk is in a state of a severe error in some cases.

In this determination process in S105, when it is determined that the error detected in the error detection disk is severe (when the determination result is Yes), the disk diagnosis control unit 153 advances the process to S106. On the other hand, when it is determined that the error detected in the error detection disk is minor (when the determination result is No), the disk diagnosis control unit 153 advances the process to S110.

Next, in S106, the diagnosis schedule control unit 152 performs a process of excluding the RAID group including the error detection disk from the execution schedule of the disk diagnosis. In this process, information on the RAID group including the error detection disk is obtained from the disk management table 130 and the obtained group is excluded from the execution schedule. The diagnosis schedule control unit 152 that executes this process provides a function equivalent to the exclusion unit 13 in FIG. 1.

Next, in S107, the I/O control unit 151 performs a process of outputting a certain warning indicating the detection of a severe error occurrence from the host I/Fs 110-1 and 110-2 to the host system 300. The I/O control unit 151 that outputs the certain warning while following this process provides a function equivalent to the output unit 15 in FIG. 1. Information for identifying the error detection disk may be attached to the warning output through this process. Information for identifying the RAID group excluded from the execution schedule of the disk diagnosis through the process in S106 may be attached to the warning output through this process. In addition, in this process, the output of the certain warning may be displayed on the display apparatus 405 of FIG. 4.

Next, in S108, the diagnosis schedule control unit 152 performs a process of determining whether or not a disk securing redundancy with a disk outside the relevant group exists among the disks belonging to the similarity disk group at this time point. In this process, first, the information on the RAID group including the disk belonging to the similarity disk group is obtained from the disk management table 130. After that, a determination is made on whether or not redundancy of the disk belonging to the similarity disk group is secured by a disk that is included in the obtained group and does not belong to the similarity disk group. In a case where the error detection disk itself belongs to the RAID group including the disk belonging to the similarity disk group, it is determined that the above-described redundancy is not secured because of the occurrence of the error.

In this determination process in S108, when it is determined that a disk securing the above-described redundancy exists (when the determination result is Yes), the diagnosis schedule control unit 152 advances the process to S109. On the other hand, in this determination process in S108, when it is determined that the disk securing the above-described redundancy does not exist (when the determination result is No), the diagnosis schedule control unit 152 advances the process to S113.

Next, in S109, the diagnosis schedule control unit 152 performs a process of excluding the disk where it is determined in the determination process in S108 that the above-described redundancy is secured from the similarity disk group and thereafter advances the process to S113.

When it is determined in the determination process in S105 that the error detected in the error detection disk is minor, a process in S110 is conducted. In S110, the process of adding all the disks included in the RAID group including the error detection disk to a similarity disk group is carried out.

Next, in S111, the diagnosis schedule control unit 152 performs a process of determining whether or not, among disks belonging to the similarity disk group at this time point, a disk securing redundancy with a disk outside the group exists. This process is similar to the above-described process in S108.

In this determination process in S111, when it is determined that the disk securing the above-described redundancy exists (when the determination result is Yes), the diagnosis schedule control unit 152 advances the process to S112. On the other hand, in this determination process in S111, when it is determined that the disk securing the above-described redundancy does not exist (when the determination result is No), the diagnosis schedule control unit 152 advances the process to S113.

Next, in S112, the diagnosis schedule control unit 152 performs a process of excluding the disk where it is determined in the determination process in S111 that the above-described redundancy is secured from the similarity disk group and thereafter advances the process to S113.

Next, in S113, the diagnosis schedule control unit 152 performs a process of changing the execution schedule of the disk diagnosis at this time point and adding the similarity disk group at this time point. With the addition of the similarity disk group to the execution schedule through this process, the frequency of the disk diagnosis with respect to the disk included in the similarity disk group at this time point is increased.

The diagnosis schedule control unit 152 that executes the processes from S108 to S113 described above provides the function equivalent to the diagnosis frequency change unit 14 in FIG. 1.

After the above-described process in S113 is completed, the process returns to S101, and the disk diagnosis under the changed schedule is carried out.

The process described above is the disk patrol control process.

Next, disk patrol operations realized while the above-described disk patrol control process is conducted in the disk control apparatus 100 of FIG. 2 will be described by using the respective drawings from FIGS. 6 to 10.

First, FIG. 6 will be described.

Figure 6:
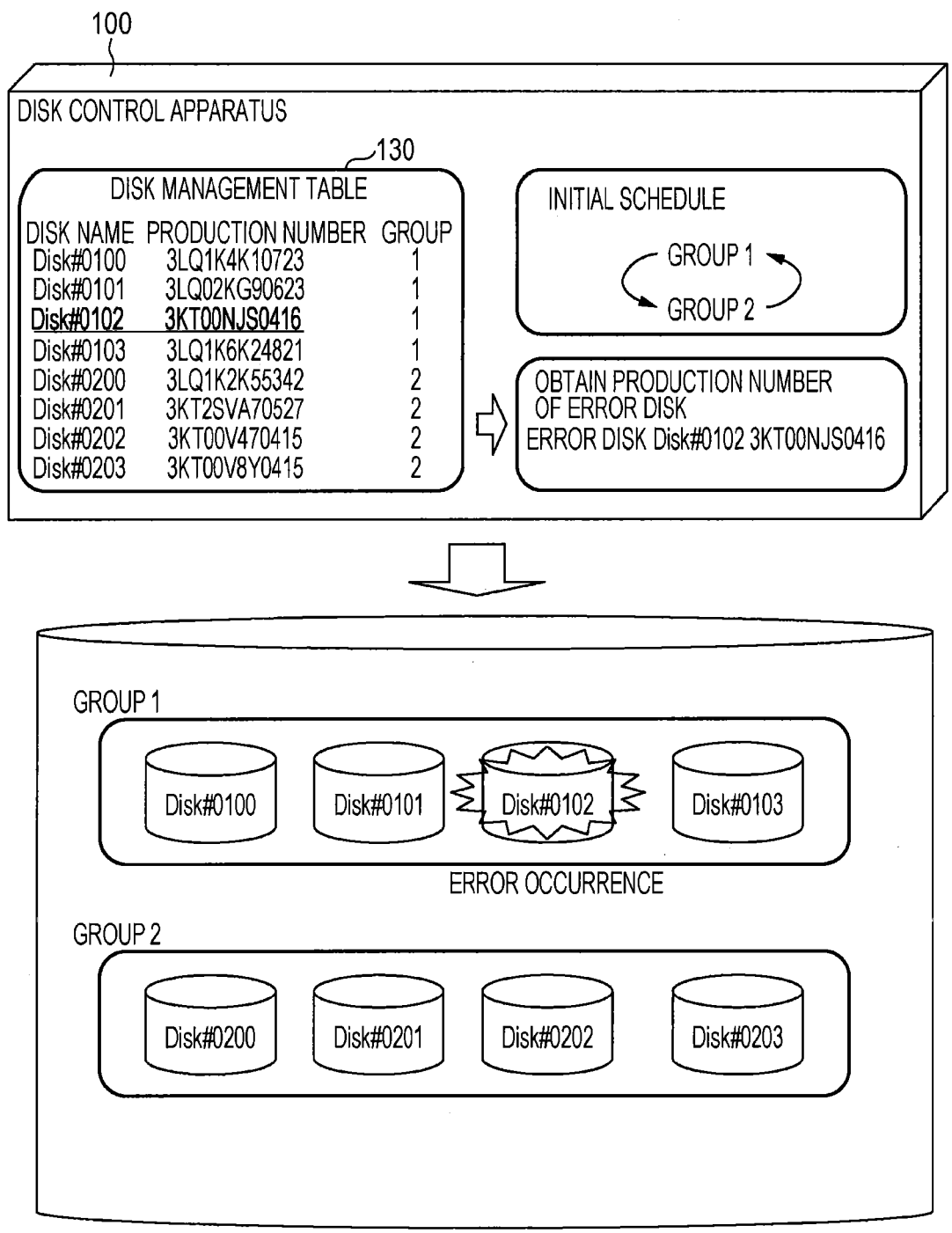
FIG. 6 is an exemplary diagram describing a disk patrol operation by the disk control apparatus (part 1)

According to an example of FIG. 6, a "group 1" and a "group 2" each represent a RAID group. Among them, the "group 1" is a group including four disks having names of Disk#0100, Disk#0101, Disk#0102, and Disk#0103, and RAID 5 is constructed by the four disks. Also, the "group 2" is a group including four disks having names of Disk#0200, Disk#0201, Disk#0202, and Disk#0203, and RAID 5 is constructed by the four disks. It is noted that according to RAID 5, data can be reconstructed even when a failure occurs in a single disk in the group, and data is not reconstructed in a case where a failure occurs in two or more disks in the group. Therefore, according to RAID 5, redundancy is secured for a failure of a single disk in the group.

According to the example of FIG. 6, the disk control apparatus 100 performs the disk patrol with respect to the disks included in the "group 1" and the disks included in the "group 2".

In the disk management table 130 held by the disk control apparatus 100, a "disk name", a "production number", and a "group" are associated with one another. The "disk name" is a name of a disk. The "production number" is a production number assigned at the time of manufacturing of a disk identified by its "disk name". The production number is an example of attribute information on the disk. In addition, the "group" represents a RAID group to which the disk identified by the "disk name" belongs.

According to the example of FIG. 6, an initial schedule in which the disk diagnosis is alternately executed on the "group 1" and the "group 2" is set in advance as the execution schedule of the disk diagnosis.

When the above-described execution of the disk patrol control process of FIG. 5 is started, the processes in S101 and S102 are repeatedly carried out and a disk error is detected by executing the disk patrol. The example of FIG. 6 represents a state in which an error of the Disk#0102 is detected through the disk patrol. When the error is detected, the process advances to S103, and the production number "3KT00NJS0416" of the Disk#0102 where the error is detected is obtained as attribute information from the disk management table 130.

Figure 7:
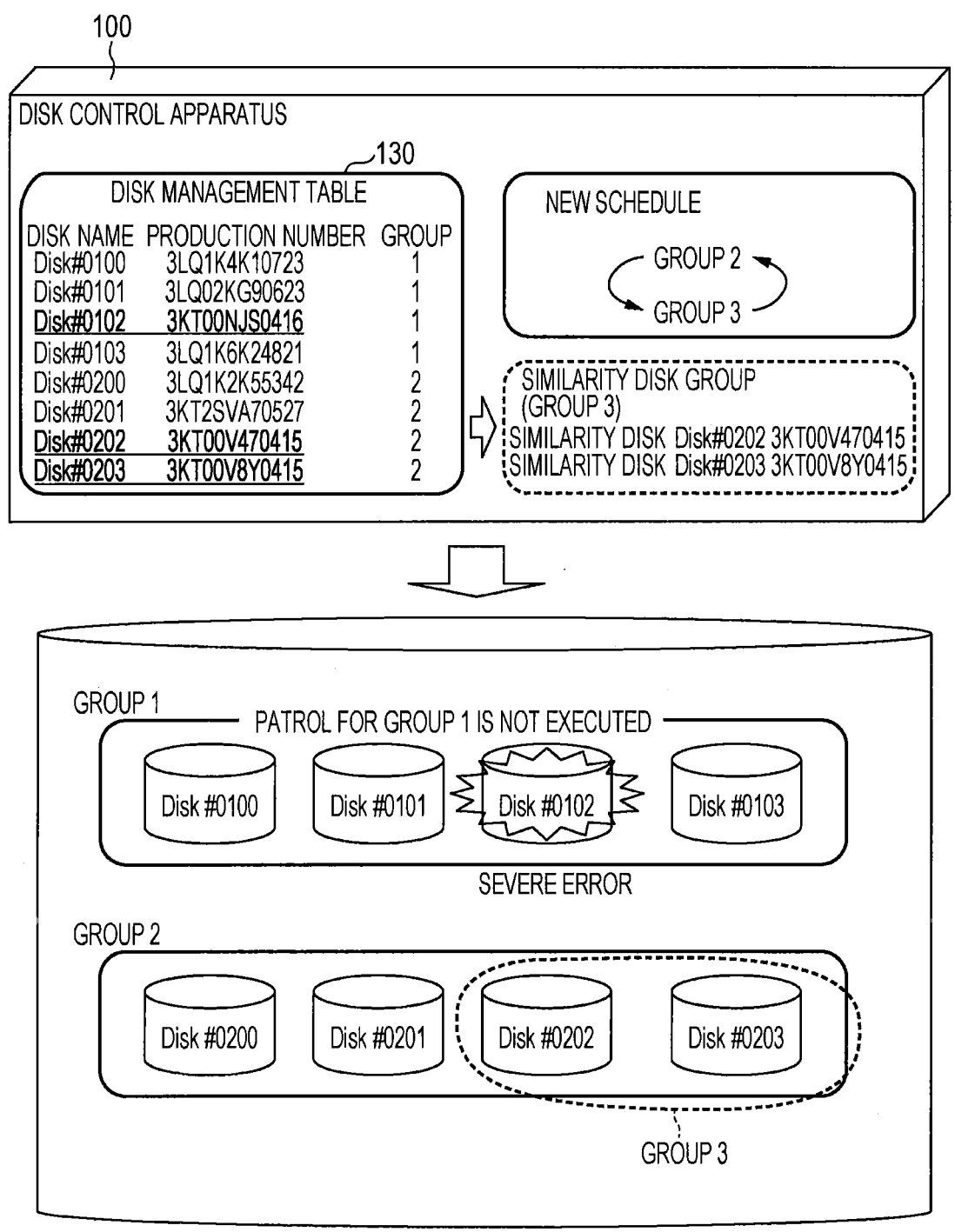
FIG. 7 is an exemplary diagram describing the disk patrol operation by the disk control apparatus (part 2)

Next, the process of creating a similarity disk group is conducted in S104, and subsequently, in S105, the process of determining whether or not the error of the Disk#0102 is severe is carried out. FIG. 7 illustrates an example of a case where the error of the Disk#0102 is severe.

According to the example of FIG. 7, through the process in S104, the Disk#0202 and the Disk#0203 are extracted as disks having production numbers that are similar to the Disk#0102 from the disk management table 130 to create a similarity disk group. In FIG. 7, this similarity disk group is represented as a "group 3" for convenience.

It is noted that in examples from FIGS. 7 to 10, a state in which eight or more characters are the same as the production number of the Disk#0102 among 12-digit production numbers assigned to the respective disks is used as the reference for determining the similarity to the attribute information.

According to the example of FIG. 7, since the error of the Disk#0102 is severe, the process in S106 is carried out next in the disk patrol control process of FIG. 5. Through the process in S106, the "group 1" that is the RAID group including the Disk#0102 is excluded from the execution schedule of the disk diagnosis. Accordingly, the execution schedule after this exclusion has only the "group 2", and the disk diagnosis on the disks included in the "group 1" is not carried out thereafter. Therefore, the frequency of the disk diagnosis on the disks included in the "group 2" is increased.

After that, a certain warning is output through the process in S107, and subsequently, through the process in S108, it is determined whether or not the disk securing redundancy with a disk outside the similarity disk group exists among the disks included in the similarity disk group.

According to the example of FIG. 7, both the Disk#0202 and the Disk#0203 are included in the "group 2" of RAID 5. Thus, these two disks do not secure redundancy with the Disk#0200 and the Disk#0201 which do not belong to the similarity disk group in the "group 2". Therefore, the determination result in S108 is "No", and both the Disk#0202 and the Disk#0203 are not deleted from the similarity disk group. Then, the process advances to S113.

In S113, the process of adding the similarity disk group at this time point to the execution schedule of the disk diagnosis is conducted. Since the execution schedule immediately before this process has only the "group 2" through the process in S106, the "group 3" that is the similarity disk group is added to the schedule through the process in S113. As a result, the subsequent execution schedule of the disk diagnosis has the "group 2" and the "group 3" on which diagnosis is repeatedly conducted. Herein, the Disk#0202 and the Disk#0203 are included in both the "group 2" and the "group 3". Therefore, the frequency at which the disk diagnosis is performed with respect to these disks is increased as compared with the frequency before detecting the error of the Disk#0102.

Next, the example of FIG. 8 will be described.

Figure 8:
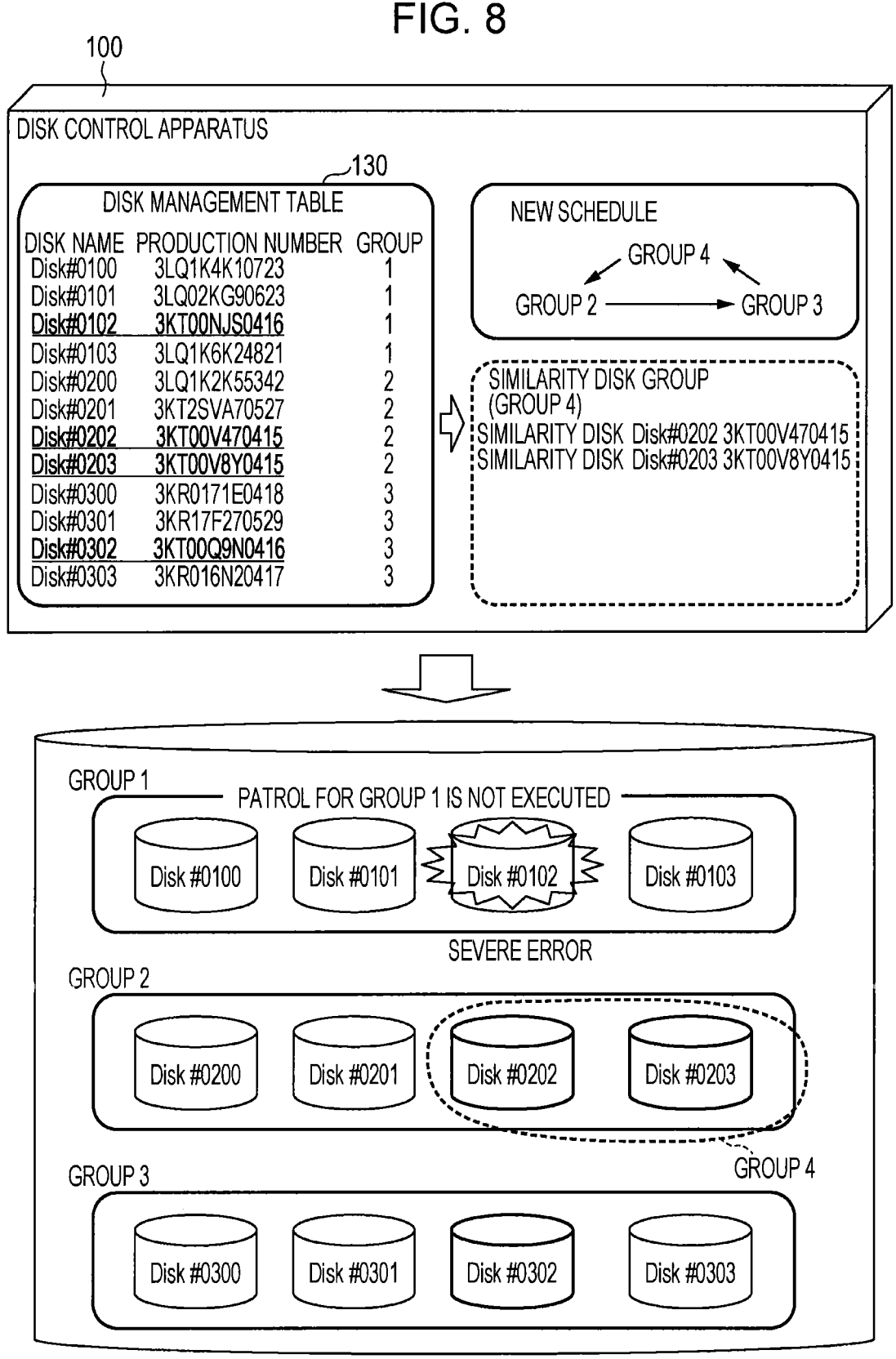
FIG. 8 is an exemplary diagram describing the disk patrol operation by the disk control apparatus (part 3)

According to the example of FIG. 8, a "group 3" that is a RAID group is added to the examples of FIG. 6 and FIG. 7. This "group 3" is a group including four disks. Names of the disks are Disk#0300, Disk#0301, Disk#0302, and Disk#0303, and these four disks constitute RAID 5. In addition, the disk management table 130 also stores information related to the Disk#0300, the Disk#0301, the Disk#0302, and the Disk#0303. Herein, it is represented that the Disk#0302 is similar to the Disk#0102 in terms of the production number.

Also, according to the example of FIG. 8, an initial schedule in which the disk diagnosis is repeatedly carried out in the order of the "group 1", the "group 2", and the "group 3" is set in advance as the execution schedule of the disk diagnosis.

When the above-described execution of the disk patrol control process of FIG. 5 is started, the processes in S101 and S102 are repeatedly carried out and a disk error is detected by executing the disk patrol. The example of FIG. 8 also represents a state in which an error of the Disk#0102 is detected through the disk patrol. When the error is detected, the process advances to S103, and the production number of the Disk#0102 where the error is detected is obtained as attribute information from the disk management table 130.

Next, the process of creating a similarity disk group is conducted in S104, and subsequently, in S105, the process of determining whether or not the error of the Disk#0102 is severe is carried out. In the example of FIG. 8, a case is assumed in which the error of the Disk#0102 is severe.

According to the example of FIG. 8, through the process in S104, the Disk#0202, the Disk#0203, and the Disk#0302 are extracted from the disk management table 130 as disks the production numbers of which are similar to the Disk#0102, and a similarity disk group is temporarily created. Herein, this similarity disk group is denoted by a "group 4" for convenience.

Since the error of the Disk#0102 is severe, the process in S106 is carried out next in the disk patrol control process of FIG. 5. Through the process in S106, the "group 1" that is the RAID group including the Disk#0102 is excluded from the execution schedule of the disk diagnosis. Therefore, in the execution schedule after this exclusion, diagnosis is carried out alternately between the "group 2" and the "group 3", and the disk diagnosis on the disks included in the "group 1" is not carried out thereafter. Therefore, the frequency at which the disk diagnosis is performed on the disks included in either the "group 2" or the "group 3" is increased.

After that, a certain warning is output through the process in S107, and subsequently, through the process in S108, it is determined whether or not the disk securing redundancy with a disk outside the similarity disk group exists among the disks included in the similarity disk group.

In the example of FIG. 8, both the Disk#0202 and the Disk#0203 are included in the "group 2" of the group of RAID 5, similarly to the example of FIG. 7. Therefore, these two disks do not secure redundancy with the Disk#0200 and the Disk#0201 that do not belong to the similarity disk group in the "group 2". In contrast to this, the Disk#0302 is included in the "group 3" that is the group of RAID 5. Thus, the Disk#0302 secures redundancy with the Disk#0300, the Disk#0301, and the Disk#0303 that do not belong to the similarity disk group in the "group 3". Therefore, the determination result in S108 is "Yes", and the process advances to S109.

In S109, the process of excluding the Disk#0302 securing redundancy from the similarity disk group is conducted. As a result, disks belonging to the "group 4" that is the similarity disk group are the Disk#0202 and the Disk#0203.

In S113, the process of adding the similarity disk group at this time point to the execution schedule of the disk diagnosis is carried out. Since diagnosis is conducted alternately on the "group 2" and the "group 3" through the process in S106 in the execution schedule immediately before this process, the "group 4" that is the similarity disk group is added to the execution schedule through the process in S113. As a result, according to the subsequent execution schedule of the disk diagnosis, diagnosis is repeatedly carried out in the order of the "group 2", the "group 3", and the "group 4". Herein, the Disk#0202 and the Disk#0203 having production numbers similar to the Disk#0102 where the severe error is detected are included in both the "group 2" and the "group 4". Therefore, the frequency at which the disk diagnosis is performed with respect to these disks is increased as compared with the frequency before detecting the error of the Disk#0102. In contrast to this, since the Disk#0302 is similar to the Disk#0102 in terms of the production number but secures redundancy in the "group 3", the frequency at which the disk diagnosis is performed on the Disk#0302 is not changed unlike the Disk#0202 and the Disk#0203.

Next, the example of FIG. 9 will be described.

Figure 9:
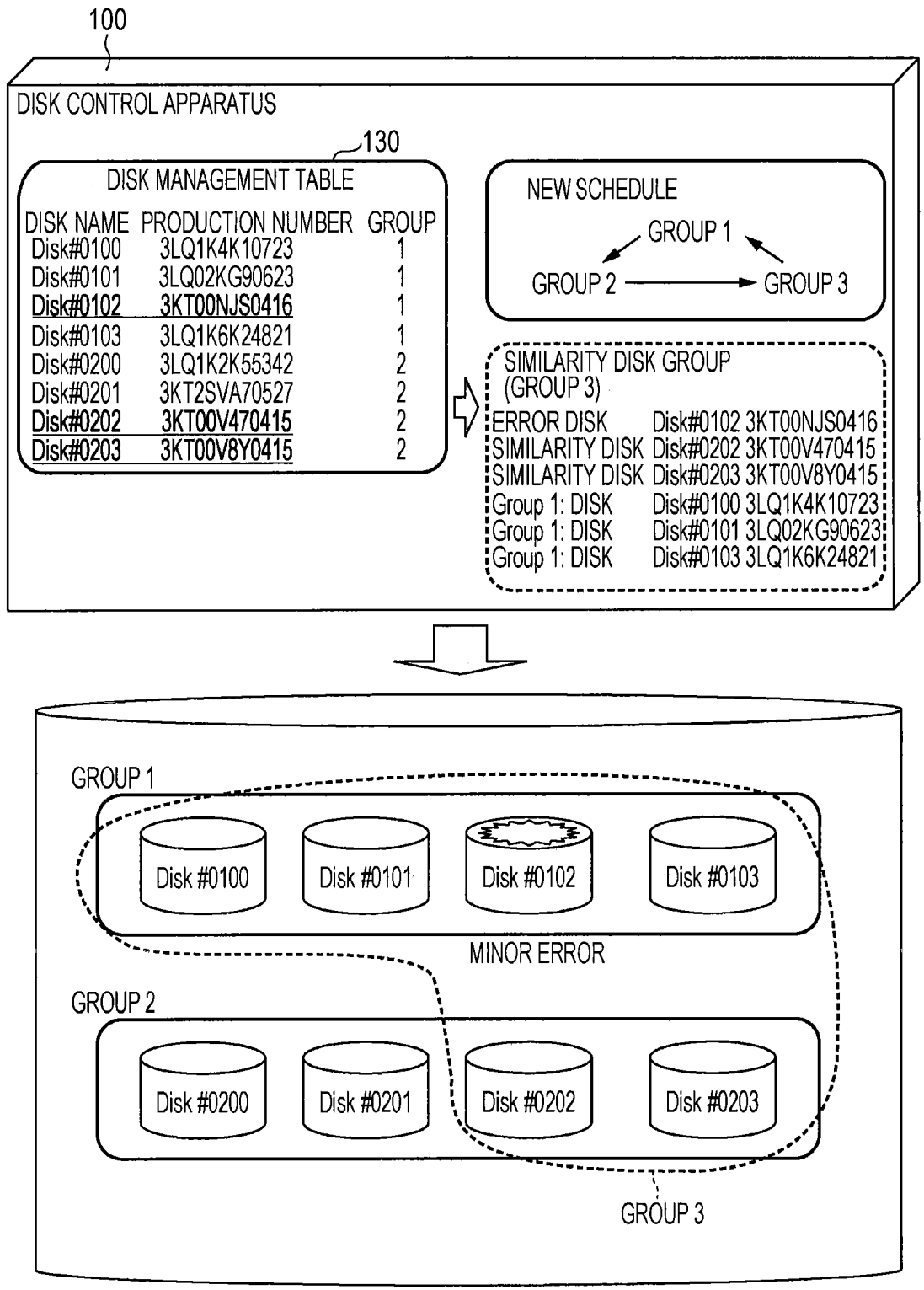
FIG. 9 is an exemplary diagram describing the disk patrol operation by the disk control apparatus (part 4)

The above-described example of FIG. 7 illustrates the case in which the error of the Disk#0102 is severe, but the example of FIG. 9 illustrates a case in which the error of the Disk#0102 is minor.

In the example of FIG. 9 also, the initial schedule in which the disk diagnosis is alternately executed on the "group 1" and the "group 2" is set in advance as the execution schedule of the disk diagnosis.

When the above-described execution of the disk patrol control process of FIG. 5 is started, the processes in S101 and S102 are repeatedly carried out and a disk error is detected by the disk patrol. An error of the Disk#0102 is detected. The process advances to S103, and the production number of the Disk#0102 where the error is detected is obtained as attribute information from the disk management table 130.

Next, the process of creating a similarity disk group is carried out in S104. According to the example of FIG. 9 also, through the process in S104, the Disk#0202 and the Disk#0203 are extracted from the disk management table 130 as disks the production numbers of which are similar to the Disk#0102 to temporarily create a similarity disk group. Herein, this similarity disk group is denoted as a "group 3" for convenience.

Next, in S105, the process of determining whether or not the error of the Disk#0102 is severe is conducted. In the example of FIG. 9, since the error of the Disk#0102 is minor, the process in S110 is carried out next. Then, through the process in S110, the process of adding all the disks included in the "group 1" that is the RAID group including the Disk#0102 to the similarity disk group is conducted. Therefore, the four disks of the Disk#0100, the Disk#0101, the Disk#0102, and the Disk#0103 included in the "group 1" are added to the "group 3".

Next, through the process in S111, it is determined whether or not among the disks included in the similarity disk group, the disk securing redundancy with a disk outside the similarity disk group exists.

In the example of FIG. 9, the Disk#0202 and the Disk#0203 are included in the "group 2" of RAID 5, and the Disk#0100, the Disk#0101, the Disk#0102, and the Disk#0103 are included in the "group 1" of RAID 5. However, these disks do not secure redundancy with disks that do not belong to the similarity disk group in the respective groups. Therefore, the determination result in S111 is "No". No disks are deleted from the similarity disk group, and the process advances to S113.

In S113, the process of adding the similarity disk group at this time point to the execution schedule of the disk diagnosis is conducted. The execution schedule immediately before this process remains the initial schedule in which the disk diagnosis is alternately executed on the "group 1" and the "group 2". Therefore, the "group 3" that is the similarity disk group is added to the execution schedule through the process in S113. As a result, in the subsequent execution schedule of the disk diagnosis, diagnosis is repeatedly carried out in the order of the "group 1", the "group 2", and the "group 3". Herein, all the disks included in the "group 3" that is the similarity disk group are included in either the "group 1" or the "group 2". Therefore, the frequency at which the disk diagnosis is performed with respect to these disks is increased as compared with the frequency before detecting the error of the Disk#0102.

Next, the example of FIG. 10 will be described.

Figure 10:
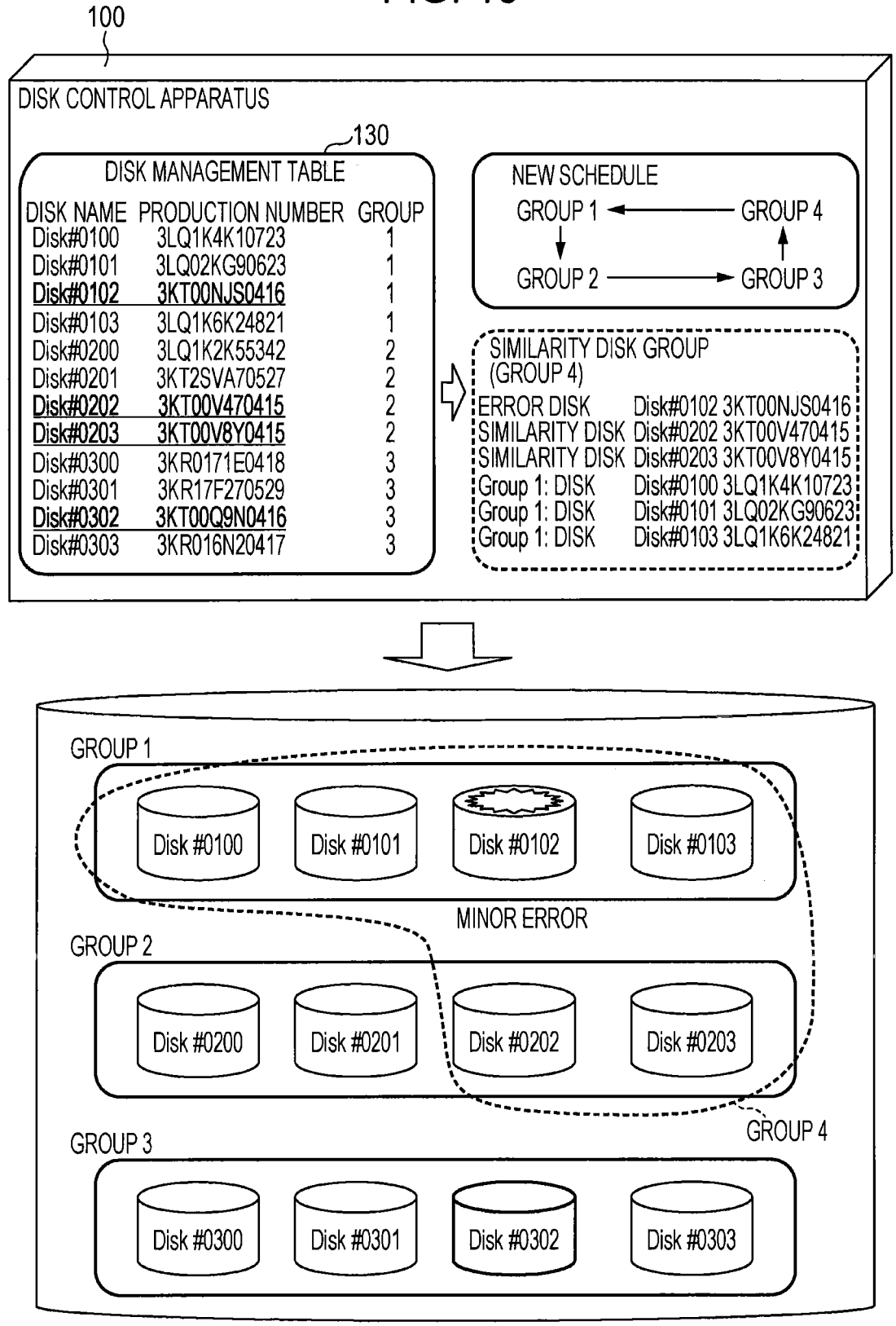
FIG. 10 is an exemplary diagram describing the disk patrol operation by the disk control apparatus (part 5).

Whereas the above-described example of FIG. 8 illustrates the case in which the error of the Disk#0102 is severe, the example of FIG. 10 illustrates a case in which the error of the Disk#0102 is minor.

In the example of FIG. 10 also, an initial schedule in which the disk diagnosis is repeatedly carried out in the order of the "group 1", the "group 2", and the "group 3" is set in advance as the execution schedule of the disk diagnosis.

When the above-described execution of the disk patrol control process of FIG. 5 is started, the processes in S101 and S102 are repeatedly carried out and the disk error is detected by executing the disk patrol. The example of FIG. 10 also represents a state in which an error of the Disk#0102 is detected through the disk patrol. When the error is detected, the process advances to S103, and the production number of the Disk#0102 where the error is detected is obtained as attribute information from the disk management table 130.

Next, the process of creating a similarity disk group is conducted in S104. According to the example of FIG. 10, through this process, the Disk#0202, the Disk#0203, and the Disk#0302 are extracted from the disk management table 130 as disks the production numbers of which are similar to the Disk#0102 to temporarily create the similarity disk group. Herein, this similarity disk group is denoted as a "group 4" for convenience.

Next, in S105, the process of determining whether or not the error of the Disk#0102 is severe is carried out. In the example of FIG. 10, since the error of the Disk#0102 is minor, the process in S110 is carried out next. Then, through the process in S110, the process of adding all the disks included in the "group 1" that is the RAID group including the Disk#0102 to the similarity disk group is conducted. Therefore, four disks of the Disk#0100, the Disk#0101, the Disk#0102, and the Disk#0103 included in the "group 1" are added to the "group 4".

Next, through the process in S111, it is determined whether or not among the disks included in the similarity disk group, the disk securing redundancy with a disk outside the similarity disk group exists.

In the example of FIG. 10, the Disk#0202 and the Disk#0203 are included in the "group 2" of RAID 5, and the Disk#0100, the Disk#0101, the Disk#0102, and the Disk#0103 are included in the "group 1" of RAID 5. However, these disks do not secure redundancy with disks that do not belong to the similarity disk group in the respective groups. In contrast to this, the Disk#0302 is included in the "group 3" of RAID 5. Accordingly, the Disk#0302 secures redundancy with the Disk#0300, the Disk#0301, and the Disk#0303 that do not belong to the similarity disk group in the "group 3". Therefore, the determination result in S111 is "Yes", and the process advances to S112.

In S112, the process of excluding the Disk#0302 where redundancy is secured from the similarity disk group is carried out. As a result, disks that belong to the "group 4" that is the similarity disk group are the Disk#0202, the Disk#0203, the Disk#0100, the Disk#0101, the Disk#0102, and the Disk#0103.

In S113, the process of adding the similarity disk group at this time point to the execution schedule of the disk diagnosis is carried out. The execution schedule immediately before this process remains the initial schedule in which the disk diagnosis is repeatedly executed in the order of the "group 1", the "group 2", and the "group 3". Therefore, the "group 4" that is the similarity disk group is added to the initial schedule through the process in S113. As a result, in the subsequent execution schedule of the disk diagnosis, the disk diagnosis is repeatedly executed in the order of the "group 1", the "group 2", the "group 3", and the "group 4". Herein, all the disks included in the "group 4" that is the similarity disk group are included in either the "group 1" or the "group 2". Therefore, the frequency at which the disk diagnosis is performed with respect to these disks is increased as compared with the frequency before detecting the error of the Disk#0102. In contrast to this, since the Disk#0302 is similar to the Disk#0102 in terms of the production number but secures redundancy in the "group 3", the frequency of the disk diagnosis is not changed unlike the disks included in the "group 4".

As described above, in the disk control apparatus 100 of FIG. 2, in a case where the degree of a detected failure of a disk is severe, a disk included in RAID together with the disk where the failure is detected is excluded from the targets of cyclic detection for the failure. With this configuration, the frequency of the failure detection performed with respect to the remaining disks that are not excluded from the targets of the cyclic detection for the failure is increased, and it is possible to promptly carry out the failure detection on the remaining disks.

It is noted that according to the above-described embodiments, the production number assigned to a disk is used as attribute information on the disk, but other types of information can also be utilized. For example, a manufacturer of the disk, a storage capacity, a manufacturing date, a manufacturing lot number, an interface format name, and a combination thereof can be utilized as attribute information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A disk control apparatus comprising:
a processor; and
a memory coupled to the processor, wherein the processor executes a process includes:
diagnosing whether or not a failure has occurred on a plurality of disk apparatuses;
determining, when the failure has occurred, whether or not the failure is a predetermined failure; and
excluding from diagnosis targets, when the failure is the predetermined failure, a disk apparatus group included in a RAID together with a failed disk apparatus that is determined to have the predetermined failure in the plurality of disk apparatuses.

2. The disk control apparatus according to claim 1, wherein the process further includes changing a diagnosis frequency by the diagnosing into higher diagnosis frequency for a disk apparatus assigned with attribute information having a certain similarity relationship with the failed disk apparatus in the disk apparatuses that are not excluded by the excluding when it is determined that the failure is the predetermined failure.

3. The disk control apparatus according to claim 2, wherein the attribute information is a production number assigned to the disk apparatus.

4. The disk control apparatus according to claim 2, wherein in the disk apparatuses assigned with the attribute information that includes the certain similarity relationship with the failed disk apparatus, the processor does not change the diagnosis frequency with respect to the disk apparatus securing redundancy for a disk apparatus assigned with the attribute information that does not have the certain similarity relationship with the failed disk apparatus.

5. The disk control apparatus according to claim 2, wherein the processor changes, when it is determined that the failure is not the predetermined failure, the diagnosis frequency into higher diagnosis frequency for a disk apparatus assigned with the attribute information that includes the certain similarity relationship with a disk apparatus having a minor failure for which it is determined that the failure is not the predetermined failure in the plurality of disk apparatuses.

6. The disk control apparatus according to claim 5, wherein the processor does not change the diagnosis frequency performed with respect to the disk apparatus securing redundancy for the disk apparatus having attribute information that does not have the certain similarity relationship with the disk apparatus having the minor failure.

7. The disk control apparatus according to claim 1, wherein the process further includes outputting, when it is determined that the failure diagnosed by the diagnosing is the predetermined failure, a warning representing a result of the determining.

8. A method for detecting failure of a disk apparatus executed by a computer, the method comprising:
diagnosing a plurality of disk apparatuses;
determining, when a failure is detected as a result of the diagnosing, whether or not the detected failure is a predetermined failure;
excluding from diagnosis targets, when it is determined that the detected failure is the predetermined failure, a disk apparatus group included in a RAID together with a failed disk apparatus which the predetermined failure is detected in the plurality of disk apparatuses; and
diagnosing each of remaining disk apparatuses that are not excluded from the diagnosis targets in the plurality of disk apparatuses.

9. The method according to claim 8, further comprising:
increasing a diagnosis frequency performed with respect to the disk apparatus assigned with attribute information that has a certain similarity relationship with the failed disk apparatus in the disk apparatuses that are not excluded from the diagnosis targets when it is determined that the detected failure is the predetermined failure.

10. The method according to claim 9, wherein in the disk apparatuses assigned with the attribute information that includes the certain similarity relationship with the failed disk apparatus, the diagnosis frequency is not changed with respect to the disk apparatus securing redundancy for the disk apparatus assigned with the attribute information that does not have the certain similarity relationship with the failed disk apparatus.

11. The method according to claim 9, wherein when it is determined that the detected failure is not the predetermined failure, the diagnosis frequency is increased with respect to the disk apparatus assigned with the attribute information that has the certain similarity relationship with a disk apparatus that has a minor failure which it is determined that the failure is not the predetermined failure in the plurality of disk apparatuses.

12. The method according to claim 11, wherein in the disk apparatuses assigned with the attribute information that has the certain similarity relationship with the disk apparatus that has the minor failure, the diagnosis frequency is not changed with respect to the disk apparatus securing redundancy for the disk apparatus assigned with the attribute information that does not have the certain similarity relationship with the disk apparatus of the minor failure.

13. A non-transitory computer-readable recording medium having stored therein a program for causing a computer to execute a disk diagnosis process, the process comprising:
   diagnosing a plurality of disk apparatuses;
   determining, when a failure is detected as a result of the diagnosing, whether or not the detected failure is a predetermined failure;
   excluding from diagnosis targets, when it is determined that the detected failure is the predetermined failure, a disk apparatus group included in RAID together with a failed disk apparatus when the predetermined failure is detected in the plurality of disk apparatuses; and
   diagnosing each of remaining disk apparatuses that are not excluded from the diagnosis targets in the plurality of disk apparatuses.

* * * * *